United States Patent
Budnik

Patent Number: 5,780,797
Date of Patent: Jul. 14, 1998

[54] HORN BUTTON SWITCH

[76] Inventor: Alan Budnik, 17951 Whitford La., Huntington Beach, Calif. 92649

[21] Appl. No.: 731,946

[22] Filed: Oct. 23, 1996

[51] Int. Cl.[6] .............................. H01H 9/00; H01H 13/52
[52] U.S. Cl. ........................................................ 200/61.55
[58] Field of Search .......................... 200/61.54, 61.55, 200/345; 74/484 R, 532

[56] References Cited

U.S. PATENT DOCUMENTS

| | | | |
|---|---|---|---|
| 1,676,487 | 7/1928 | Geyer | 200/61.55 |
| 1,761,949 | 6/1930 | Wood et al. | 200/61.55 X |
| 1,967,030 | 7/1934 | Jull | 200/61.55 X |
| 2,119,752 | 6/1938 | Pulleyblank | 200/61.55 |
| 2,454,242 | 11/1948 | Wharam et al. | 200/61.55 |
| 2,625,618 | 1/1953 | Creson | 200/61.55 |
| 2,631,204 | 3/1953 | Kibiger | 200/61.55 |

OTHER PUBLICATIONS

Excerpt from Boyd Wheels brochure (1995).
Excerpt from Weld Racing, Inc.'s 1995 Style Guide.
Excerpt from Budnik Wheels Style Guide (Aug., 1994).

*Primary Examiner*—J. R. Scott
*Attorney, Agent, or Firm*—Price, Gess & Ubell

[57] ABSTRACT

A horn button is provided wherein the button is a noncircular element mounted flush with respect to the top surface of a surrounding housing. A relatively large coil spring element is sandwiched within the housing between the button element and a disc closing the rear of the housing. A flexible retainer component is further provided which can be manually inserted between a rear interior lip of the housing and the disc in order to hold the assembly together.

28 Claims, 2 Drawing Sheets

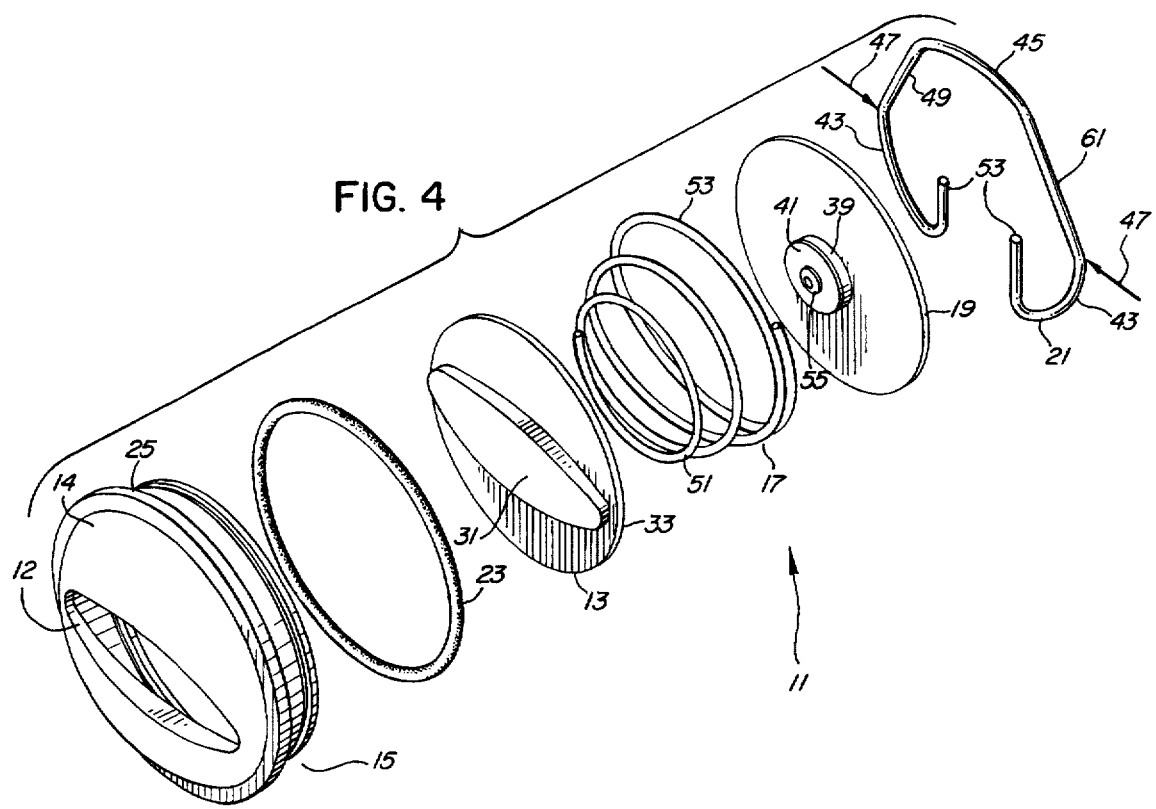

HORN BUTTON SWITCH

BACKGROUND OF THE INVENTION

1. Field of the Invention

The subject invention relates generally to vehicles and, more particularly, to an improved horn button mountable in conjunction with a vehicle steering wheel.

2. Description of Related Art

Vehicle horn buttons are known in the prior art. Horn buttons of the type under consideration have typically employed a button actuator mechanism having a number of interior screws threaded into holes tapped into the underside of the button with an individual spring vertically positioned about the shaft of each screw. This arrangement is employed to bias the button actuator mechanism in a nonoperative position, while permitting it to be pressed inward against the spring bias in order to honk the horn. Such prior art horn buttons typically require hand tools for assembly, for example, snap ring pliers applied to a clamp to hold the assembly together.

Such prior art horn buttons exhibit a number of disadvantages. First is the amount of labor required to drill and tap the multiple screw holes and the labor required to employ snap ring pliers and other tools to install the screws and clamp the unit together. In addition, the screw holes may not be tapped to the same depth, resulting in a button actuator which is skewed and not mounted flush with its surrounding surfaces.

OBJECTS AND SUMMARY OF THE INVENTION

It is therefore an object of the invention to improve horn buttons;

It is another object of the invention to eliminate the need for interior countersunk screws in horn button design;

It is another object of the invention to provide a horn button which is manually and easily assembleable without tools; and It is a further object of the invention to provide a horn button wherein the button actuator is adapted to carry a logo in a permanently fixed orientation.

These and other objects are accomplished according to the invention by provision of a horn button wherein the button is a noncircular element mounted flush with respect to the top surface of a surrounding housing. A relatively large coil spring element is sandwiched within the housing between the button element and a disc closing the rear of the housing. A flexible retainer component is further provided which can be manually inserted between a rear interior lip of the housing and the disc in order to hold the assembly together.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 4 is an exploded perspective view of the horn button of the preferred embodiment.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a readily manufacturable, aesthetically pleasing, and easily assembled horn button.

Figure 1:
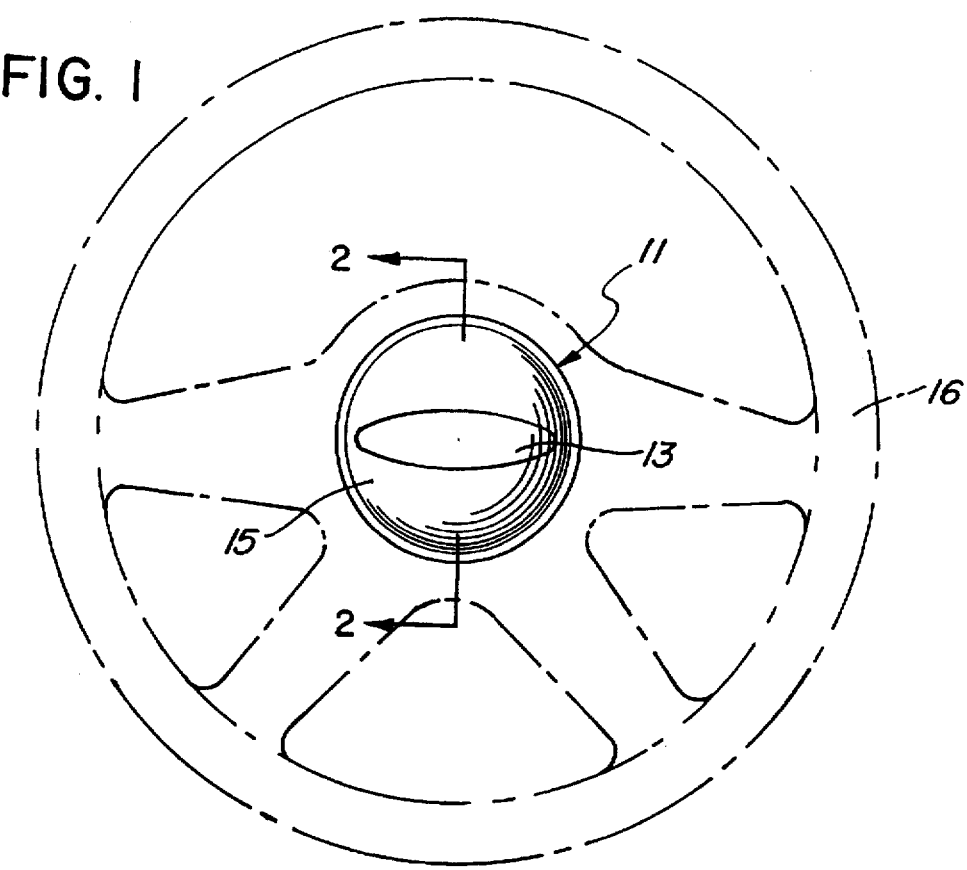
FIG. 1 is a front view illustrating a horn button according to the preferred embodiment and positioned with respect to a steering wheel shown in phantom.

FIG. 1 illustrates the horn button 11 of the preferred embodiment mounted in the center of a steering wheel 16. The horn button 11 includes a button actuator 13 mounted in a housing 15. As may be seen, the button actuator 13 is noncircular, in this case oblong or elliptical, such that it will not rotate with respect to the housing 15. The length of the engagement between the button actuator 13 and the opening in the housing 12, and the non-circular shape of the button actuator, allows the button actuator 13 to pivot within the housing 15 without binding. The non-circular shape of the button actuator 13 facilitates smooth operation with minimal clearance required between the button actuator 13 and the housing 15. The button actuator 13 may therefore be used to display a logo or other symbol in a nonskewed fashion to the driver and other occupants of the vehicle. Furthermore, the front surface 14 of the housing 15 has sufficient thickness to permit grooves and/or ribs (not shown) which match the design of the steering wheel spokes in such a way as to compliment or continue the design across the steering wheel and present a continuous design through the horn button 11.

Figure 2:
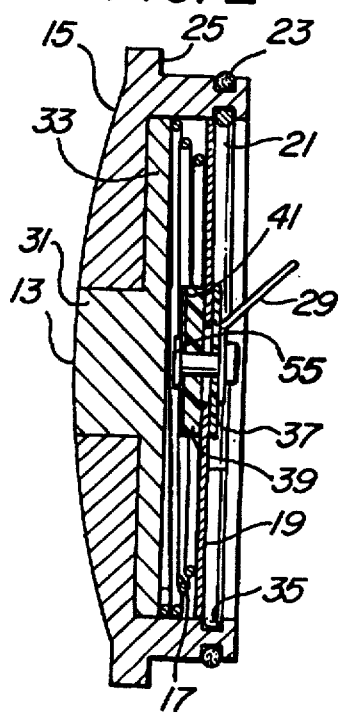
FIG. 2 is a side sectional view of the horn button of the preferred embodiment taken at 2—2 of FIG. 1.

As seen particularly in connection with FIGS. 2 and 4, the horn button actuator 13 includes a raised elliptical top surface portion 31 attached to a disc-shaped rear plate 33. The actuator 13 and housing 15 may be constructed of, for example, billet aluminum in which case the actuator is preferably fabricated as a single unitary part, as is the housing 15. These parts need not be of unitary construction, however, and could be fabricated as multiple pieces, attached by welding, threading, or other conventional means.

As seen in FIG. 2, the horn button housing 15 has an oval crowned surface which is arced in cross-section and mates flush with a similarly contoured top surface of the elliptical actuator portion 31. This contouring provides a unique and aesthetically pleasing appearance to the unit and is facilitated by the overall stability of the structure of the preferred embodiment.

A relatively large spring 17 is mounted in the interior of the housing 15 and sandwiched between the back surface of the disc 33 and a rear disk 19, which closes the rear of the housing when in an assembled relation. The spring 17 may be generally helically wound and, as shown, has a bottom circular coil 53 of substantially the same diameter as the rear disc 19 and a top coil 51 of diameter sufficient to stably mount the actuator button 13 so that it does not wobble. The top coil 51 may be concentrically positioned with respect to the rear surface of the rear portion 33 of the actuator 13 with its circumference spaced about ¼-inch within the circumference of the plate 33.

Figure 3:
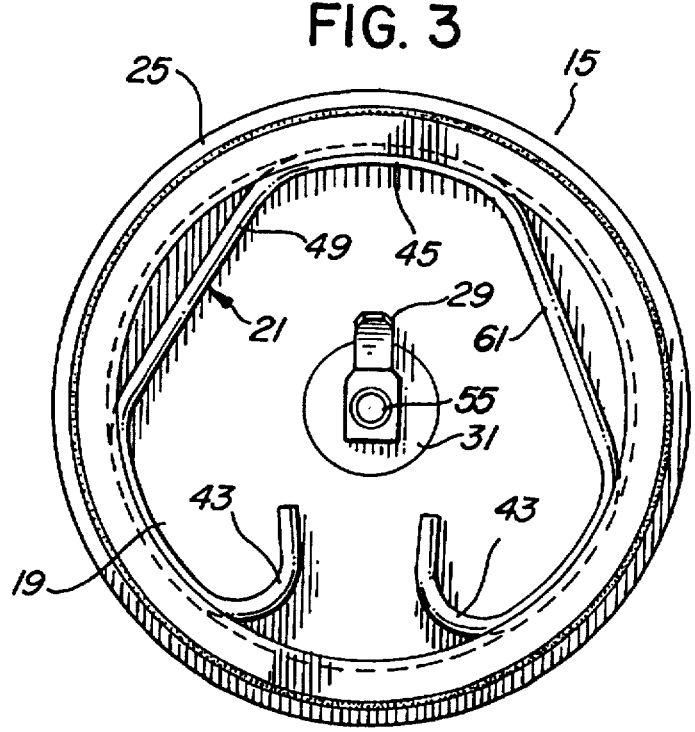
FIG. 3 is a drawn-to-scale rear view of the horn button of the preferred embodiment as assembled.

As seen in FIGS. 2 and 3, a winged retainer component 21 is inserted between a rear interior lip 35 of the housing and the rear disc 19 in order to hold the assembly together. The retainer 21 includes first and second mirror image retainer wings 43 and a nose portion 45. The nose portion 45 is connected to the winged portions 43 by first and second arms 49, 61, which generally meet at an acute angle with the winged portions. The winged portions 43 are further turned in and up at their respective ends, forming upright portions 53. This rounding off facilitates manual gripping and squeezing of the retainer 21.

The retainer 21 is preferably made of relatively springy metal such as steel or stainless steel. The winged portions 43 may therefore be grasped in the hand and squeezed in towards one another along the directions of the arrows 47 of FIG. 4. When such hand pressure is released, the wings 43 will move back to their original position. In order to insert the retainer 21 and thereby hold the assembly together, the nose portion 45 is first inserted between the rear disc 19 and the lip 35, and the winged portions are thereafter manually squeezed in towards one another and slipped or snapped beneath the interior lower rim 35. This installation technique results in the retainer 21 residing in the position shown in FIG. 3 where it is compressed within the contour of the lip 35.

As further illustrated in FIGS. 2–4, the rear disc 19 has an electrical contact 29 mounted in the center thereof including a conductive rivet 55. The rivet 55 holds together in assembled relation a conductive metal disc 41, an insulator disc 39, a second insulator disc 37, and an electrical contact conductive portion 29. Thus, when the horn button actuator element 13 is depressed against the bias of the spring 17, the rear plate 33 of the actuator 13 comes into contact with the conductive rivet 55, completing an electrical circuit between the vehicle's horn relay (not shown) and ground.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. The horn actuator apparatus comprising:

a housing having an opening in a top surface thereof, an interior chamber of uniform cross-sectional contour, and an open rear end;

an actuator element including a plate portion having a top surface and a bottom surface, said bottom surface having an outer periphery, said plate portion further having an outer edge shaped to match the cross-sectional contour of said chamber, said plate portion being slideably mounted in said chamber, said actuator element further including a raised surface portion extending upwardly from the top surface of said plate portion, said raised surface portion having a periphery conforming in shape to the shape of said opening;

a rear plate means for closing the open rear end of said chamber and slideably insertable manually into and out of said chamber;

a spring means sandwiched between said rear plate means and said actuator element and having an upper portion thereof shaped to engage the outer periphery of the bottom surface of said plate portion of said actuator element for stably positioning said actuator element with respect to said housing and such that said raised surface portion is located within said opening and is manually depressable against a bias supplied by said spring means; and a retainer means manually insertable into said housing for holding said rear plate means in place, thereby retaining said spring means in place between said rear plate means and said actuator element while also retaining said raised surface portion located in said opening.

2. The apparatus of claim 1, wherein said raised surface portion has a top surface contoured to fit flush with the top surface of said housing and wherein said opening is non-circular such that said raised surface portion may move up and down in said opening, but cannot rotate with respect to said housing.

3. The apparatus of claim 1 wherein said housing includes a rear interior lip having a cross-section greater than that of said interior chamber, and thus being laterally recessed with respect to said chamber; and wherein said retainer means comprises:

a flexible retainer element having first and second wing means and a nose portion, the first and second wing means being manually squeezeable so as to move towards one another so as to facilitate insertion of said retainer element into said lip.

4. The apparatus of claim 3 wherein said retainer element is so contoured that the nose portion thereof is first insertable beneath said rear interior lip and the first and second wing means are thereafter snappable into position beneath said rear interior lip.

5. The apparatus of claim 2 wherein said non-circular opening conforms in shape to an ellipse having first and second ends.

6. The apparatus of claim 5 wherein each of said first and second ends lay adjacent the periphery of said housing.

7. The apparatus of claim 3 wherein the cross-sectional contour of said interior chamber is circular.

8. The apparatus of claim 1 wherein the upper portion of said spring means is recessed back slightly by ¼" or less from said inner periphery.

9. The apparatus of claim 3 wherein said first and second wing means are mirror images of one another.

10. The apparatus of claim 1 wherein said retainer means consists of first and second wing portions each having an acutely angled arm forming into a rounded nose portion, the first and second wing portions being mirror images of one another and terminating in a pair of oppositely disposed and spaced apart inwardly curved ends.

11. The apparatus of claim 1 wherein the cross-sectional contour of said interior chamber is circular.

12. The apparatus of claim 1 wherein said plate portion comprises an electrically conductive material and further including an electrical contact means mounted on said rear plate means for establishing an electrical circuit with said electrically conductive material.

13. The apparatus of claim 3 wherein said rear plate means is manually removable by grasping the actuator apparatus and manually pinching the first and second wing means.

14. A horn actuator assembly comprising:

an actuator element including a plate portion having a top surface, a bottom surface and an outer edge, said actuator element further having a raised surface portion extending upwardly from the top surface of said plate portion, said raised surface portion having an outer contour;

a housing having an opening in a top surface thereof and an interior chamber having an open rear end and a cross-sectional contour matching the shape of said outer edge of said plate portion, said housing further including a top surface overlying said plate portion and having an opening therein conforming in shape to the outer contour of said raised surface portion;

a rear plate having an outer edge matching the cross-sectional contour of said interior chamber for closing the open rear end of said chamber;

spring means sandwiched between said rear plate and the bottom surface of said actuator element for positioning said actuator element with respect to said housing such that said raised surface portion is located within said opening and is manually depressable against a bias supplied by said spring means; and a retainer means manually insertable into said housing for holding said rear plate means in place, thereby retaining said spring means in place between said rear plate and positioning the raised surface portion of said actuator element in said opening.

15. The assembly of claim 14 wherein said raised surface portion has a top surface contoured to fit flush with the top surface of said housing and a non-circular peripheral contour, and wherein said opening has a non-circular inner contour shaped to slideably receive and mate with the peripheral contour of said raised surface portion such that said raised surface portion may move up and down in said opening, but cannot rotate with respect to said housing.

16. The assembly of claim 14 wherein said housing includes a rear interior lip having a cross-section greater than that of said interior chamber, and thus being laterally recessed with respect to said chamber; and wherein said retainer means comprises:

a flexible retainer element having first and second wing means and a nose portion, the first and second wing means being manually squeezeable so as to move towards one another.

17. The assembly of claim 16 wherein said retainer element is so contoured that the nose portion thereof is first insertable beneath said rear interior lip and the first and second wing means are thereafter snappable into position beneath said rear interior lip.

18. The assembly of claim 15 wherein said non-circular opening conforms in shape to an ellipse having first and second ends.

19. The assembly of claim 18 wherein each of first and second ends of said ellipse lies adjacent the periphery of said housing.

20. The assembly of claim 16 wherein the cross-sectional contour of said interior chamber is circular.

21. The assembly of claim 14 wherein said spring means comprises a single coiled spring having an upper coil shaped to track the outer periphery of the bottom surface of said plate portion.

22. The assembly of claim 20 wherein the cross-sectional contour of said interior chamber is circular.

23. The assembly of claim 14 wherein said plate portion comprises an electrically conductive material and further including an electrical contact means mounted on said rear plate for establishing an electrical circuit with said electrically conductive material.

24. A horn actuator assembly comprising:

a single piece actuator element including a circular plate having a top surface and bottom surface, said actuator element further having a raised surface portion extending upwardly from the top surface of said plate portion, said raised surface portion having an outer contour;

a single piece circular housing having a non-circular opening in a top surface thereof, an interior chamber having a circular cross-section, an open rear end, and a rear interior lip located below said interior chamber, said interior lip having a cross-section greater than that of said interior chamber, and thus being laterally recessed with respect to said chamber, said top surface overlying said plate portion and having an opening therein conforming in shape to the outer contour of said raised surface portion, said raised portion of said actuator element having a top surface contoured to fit flush with the top surface of said housing;

a circular rear plate having a top surface and a diameter selected such that said rear plate closes the open rear end of said chamber;

a single tapered coil spring sandwiched between said rear plate and the bottom surface of said actuator element, said spring having a circular upper coil abutting the bottom surface of said actuator element adjacent the outer edge thereof and a lower circular coil abutting the top surface of said rear plate adjacent the outer edge thereof;

a retainer means manually insertable into said housing for holding said rear plate means in place, thereby retaining said spring in place between said rear plate and said actuator element with said raised surface portion of said actuator element located in said opening, said retainer means including a flexible retainer element having first and second wing means and a nose portion, the first and second wing means being manually squeezeable so as to move towards one another to facilitate insertion and removal of said retainer element into and out of said interior lip.

25. The assembly of claim 24 wherein said actuator element further comprises electrically conductive material, said assembly further including an electrical contact means mounted on said rear plate for establishing an electrical circuit with said electrically conductive material.

26. The horn actuator apparatus comprising:

an actuator element including a plate portion having a top surface, a bottom surface and an outer edge, said actuator element further having a raised surface portion extending upwardly from the top surface of said plate portion, said raised surface portion having an outer contour and a top surface means for receiving a manual activation force;

a housing having an opening in a top surface thereof and an interior chamber having an open rear end and a cross-sectional contour matching the shape of said outer edge of said plate portion, said housing further including a top surface overlying said plate portion and having an opening therein conforming in shape to the outer contour of said raised surface portion.

27. The apparatus of claim 26 wherein said raised surface portion has a top surface contoured to fit flush with the top surface of said housing and a non-circular peripheral contour, and wherein said opening has a non-circular inner contour shaped to slideably receive and mate with the peripheral contour of said raised surface portion such that said raised surface portion may move up and down in said opening, but cannot rotate with respect to said housing.

28. The apparatus of claim 27 further including a spoke of a vehicle steering wheel and further including a grooved design fabricated on said spoke and continuing through the top surface of said housing.

* * * * *